United States Patent Office 3,132,027
Patented May 5, 1964

---

3,132,027
PROCESS OF USING POLYOLEFIN HOT MELT COATING COMPOSITIONS
Frederick H. Norton and John F. Voeks, Concord, Calif., assignors to The Dow Chemical Company, Midland, Mich., a corporation of Delaware
No Drawing. Filed July 11, 1960, Ser. No. 41,748
14 Claims. (Cl. 99—169)

This invention has reference to an ameliorated technique for using coating compositions comprising polymers of α-olefin monomers, which polymers are especially suited for use in compositions to coat and envelope many of a wide variety of articles, particularly foodstuffs, in tightly adhering protective coverings that may be readily stripped or peeled from the article. More particularly, it is concerned with improving the properties and characteristics of such polyolefin coating compositions as may be applied from the molten state and which are of the type or variety that are frequently referred to and characterized as being "hot melts."

The invention has more specific reference to a rapid quenching process for hardening and simultaneously improving the quality of applied coatings of such compositions on various articles and to the coated articles thereby obtained.

Most known hot-melt coating compositions for foodstuffs and other articles which possess the desirable properties of strength, clarity, flexibility, film tenacity, and ease of efficient and clean film removal from the coated article over a wide temperature range have, of necessity, been formulations of two essential ingredients. These, principally, are a thermoplastic material, i.e., ethyl cellulose or polyvinyl chloride, and a lubricant such as a refined mineral oil of a paraffinic variety or an equivalent material derived from a naphthenic petroleum source. Optionally, small percentages of a heat stabilizing agent and an antioxidant may be included in these formulations.

There have recently been developed hot-melt coating compositions that, advantageously, may contain only a single thermoplastic ingredient. These are comprised of certain amorphous polyolefins, such as amorphous polypropylene. Although such amorphous polyolefin compositions provide hot-melt coatings with many desirable properties, the material available for such use must have certain inherent properties in order to make it applicable for the intended purpose. The essential intrinsic characteristics of the amorphous polyolefins (including copolymers of monomers suitable therefor) adapted for use in hot-melt coatings are low molecular weight, generally in the range from about 15,000 to about 40,000, and a low degree of crystallinity, generally between about 15 and about 30 percent.

Amorphous polyolefins may be obtained from polyolefins prepared by the well known Ziegler polymerization process. In this process, the polymerization of olefins is conducted under the influence of catalyst systems which comprise admixtures of strong reducing agents, such as aluminum alkyls and compounds of group IV–B, V–B and VI–B metals of the periodic system, especially titanium and zirconium. Relatively low pressures ranging from 1 to 100 atmospheres may be employed with benefit when Ziegler catalyst systems are utilized for the polymerization of olefins.

The polyolefins prepared by means of the Ziegler process can be separated into two phases by solvent extraction. The two phases consist of a glossy amorphous polymer and a white crystalline polymer and can be separated mechanically. Unfortunately, the amount of amorphous polyolefin which can be obtained from any normal batch of polyolefin is relatively small, being usually on the order of 10–30 percent. It is this amorphous polymer which is best adapted for use as hot-melt coatings.

Thus, if "crystalline" polyolefins of low molecular weight or mineral oil-containing compositions thereof are applied by any of the conventional coating processes, such as brushing, dipping, splashing, spraying and others, the coating formed is either brittle or pasty. This quality or type of coating is obviously unsatisfactory.

However, certain low molecular weight crystalline polyolefins or their compositions can be made into clear, strong films and coatings by the novel, quick-quenching technique of the present invention.

Therefore, it is the principle object of this invention to provide a new and useful improvement in the hot-melt polyolefin coating process which causes a decrease in the crystallinity of low-molecular weight, polyolefin structures sufficient to produce polymers with a reduced crystalline content suitable for use in protective coating compositions.

Another object of this invention is to provide a new and useful improvement in the hot-melt process for applying protective coatings comprised of polyolefins having a much broader distribution of molecular weight and crystalline content than have previously been applicable, which coatings are capable of producing tightly adhering films on a large variety of articles, particularly frozen meats and meat products.

A further object of this invention is to provide a new and useful improvement in the process for applying protective, hot-melt polyolefin coatings that could beneficially utilize relatively inexpensive materials and readily available conventional hot-melt coating equipment.

The advantages, benefits, desirable features and objectives may, as indicated in the foregoing, be achieved in and by a method of rapidly cooling or quenching the hot films deposited or applied from molten, polyolefin, coating compositions, within not more than about 60 seconds after coating, to a temperature at or below ambient temperatures, i.e., to or below $+20°$ C. to $-25°$ C. The quenched films possess the desired properties of strength, clarity, flexibility, film tenacity and ease of efficient and clean film removal from the coated article.

Rapidly quenched films deposited from the polyolefin hot-melt coating compositions employed in the practice of the invention, such as polyethylene, polyisobutylene, and polypropylene, and copolymers therefrom comprising from 85 to 100 percent solids, are generally clear, non-tacky, non-bleeding and flexible. For example, coated films remain tough, flexible and clear after being quickly cooled to a substantially low temperature. The crystalline content of the quenched films, determined by X-ray analysis, shows a substantial decrease in crystallinity upon such treatment. Generally, the crystallinity of the polymer in such a treated applied coating is brought entirely within the relatively amorphous range of 15 to about 30 percent crystallinity, despite the fact that at least a portion, if not all of the starting crystalline polyolefin employed has a crystallinity in excess of 30 percent. Ordinarily, coatings comprised of polyolefins in which more than about 5–10 weight percent of the polymer present has a crystallinity in excess of about 30 percent are undesirable and generally subject to the above mentioned inferiorities associated with highly crystalline materials.

The coating compositions applicable in the quench coating process of the present invention form molten mixtures at temperatures in excess of the boiling point of water, i.e., generally in the range of from about 140° C. to about 220° C. They form clear liquids having viscosities in the indicated temperature range of from about 3500 to about 6500 centipoises. For coating the various types of articles, including foodstuffs, within the scope of the invention, encasing films formed from polyolefin coating compositions having a viscosity in the molten state not in excess of about 5,000 centipoises while maintained within a temperature range of from about 140° to 220° C. are a preferred type that provide particularly satisfactory, durable, closely-adherent packaging films. The compositions may be applied in any desired manner to articles which may be at any temperature beneath that of the hot melt.

Brushing, spraying, splashing and other techniques may be employed in order to apply the beneficial coating compositions of the invention to the articles being coated. It is generally expedient, especially because of the relatively viscous nature of the present compositions and in order to more readily meet the requirements of commercial production, to employ spray or splash coating techniques in order to manufacture the desired coated articles. In such an operation, each of the articles to be coated is passed under or over, or both, one or more non-atomizing sprays of the molten composition or through one or more falling curtains or sheets thereof, or is otherwise splashed thoroughly therewith, to cover their entire surface. This effects the desired "pick-up" of the coating. After this, the applied composition is submitted to the rapid cooling or quenching process for hardening and concurrently improving the quality of the applied coatings.

The polyolefin compositions combined with the rapid quenching process of the present invention are, as has been indicated, particularly well suited for being applied by machines which coat the hot-melt over the articles as a liquid film from nozzles especially constructed and designed for the purpose. Such a method of application is especially well suited to provide economically and desirably thin, integral and uniform coatings on a rapid and expedient mass handling and production basis. Application of the hot melt by means of a liquid film or falling curtain effect provides the most advantageous results in these regards.

Thus, due to the great viscosity of the present polyolefin coating compositions, dip coating may be an unattractive mass-production procedure for their application. Furthermore, dip coating oftentimes tends to result in undesirably thick coating layers, especially when viscous formulations are employed and to be a less efficient method of application than machine coating. Atomized spray coating of the hot melts are oftentimes undesirable for the reason that they may cause the coating to be formed with poor integrity and coherence since the atomized hot melts do not seem to be able to fuse together well on the coated article.

Coated articles prepared in accordance with the improved process of the present invention have a highly attractive and exceptionally pleasing appearance. The coating has absolute transparency over a wide temperature range. The transparency is not effected at temperatures as low as those in the neighborhood of about −20° C. and lower. This desirable feature permits a satisfactory visual inspection and consumer appraisal to be made of the coated article. The coating does not end to bleed or exude the lubricating component, if one has been included in the coating formulation. Thus, the coating is not sticky, oily, greasy, slippery or otherwise uncomfortable to touch or difficult to grip when handled. It adheres tightly as a thin, clear film about the article and conforms closely to its contours, even when the articles are irregularly shaped, including comestibles and other than food products, such as spark plugs, tools, wood carvings, or deeply embossed jewelry.

The polyolefin coating compositions improved by practice of the present invention are comprised essentially of a film-forming, α-olefin polymer of a monomer that contains from 2 to about 4 carbon atoms and which has a molecular weight between about 8000 and about 50,000. They may, as has been indicated, be prepared by polymerizing the α-olefin monomer in a suitable organic solvent in the presence of a conventional Ziegler type catalyst system, such as a mixture of aluminum triethyl and titanium trichloride. Products may also be employed from other known processes for producing macromolecular polyolefins of such nature, including those that utilize such materials for catalysts as chromium oxide on silicated alumina, hexavalent molybdenum compounds and charcoal supported nickel-cobalt. Belgian Patent Number 530,617 and Canadian Patent Number 502,597 are representative of other art that relates to the various macromolecular linear polyolefins that have recently become available and which may be employed in practice of the present invention.

Various non-toxic antioxidants may be employed in the compositions employed in the present invention in order to inhibit oxidative degradation of the polyolefins or compositions therefrom. Typical of such antioxidants are 2,2′-methylene-4-methyl phenol which is obtainable under the trade designation "Inhibitor 162"; 2,6-ditertiary butyl-4-methyl phenol (commercially available under the trade designation "Ionol"); and certain alkyl substituted phenols, such as those which are obtainable under the trade designation "Santonox." Ordinarily, quantities of such non-toxic antioxidant materials up to about 2 weight percent, based on composition weight, and advantageously between about 0.001 and 1.0 weight percent, may be incorporated in the polyolefin hot-melt coatings of the invention.

It may be beneficial to incorporate certain non-toxic color stabilizers in the hot-melt compositions to facilitate the retention of a desirably clear and color-free condition in the coating. Advantageously, the color stabilizers which may be employed include mixed organic phosphite-epoxy compounds including those that may be obtained under the trade designation "Advastab CH-49" (a mixture of about 72 weight percent of n-butyl ester of epoxidized fatty acids and about 28 weight percent of triphenyl phosphite); and "Advastab X CH-201" (a mixture of about 17 weight percent of triphenyl phosphite and about 83 weight percent of n-butyl ester of epoxidized fatty acids). Up to about 10 weight percent, based on composition weight, of such non-toxic color stabilizer additment, may be incorporated in the polyolefin hot-melt coatings. Utilization of between about 0.001 and 2.0 weight percent of such color stabilizers, generally provides advantageous results.

The lubricating constituent that may optionally be employed in the coating compositions that may be employed in the present process include such oleaginous material as refined and deodorized castor oil, petrolatum, refined mineral oil of a paraffinic variety or an equivalent material derived from a naphthenic petroleum source. It is desirable and ordinarily preferable for light color or water white mineral oils to be employed. Mineral oils having a viscosity in the range from about 80 to about 400 Saybolt units at 100° F. are ordinarily most advantageous to use. Normally mineral oil of a refined grade suitable for human consumption is preferred for economic as well as technical reasons when used in coating food articles, however, other materials may be used if desired. Microcrystalline waxes may be employed to impart lubrication to the polymeric component of the coating. Also applicable for this purpose are liquid, low molecular weight polyolefins (such as polyethylene or polypropylene), when such polyolefins are of the variety knows as oils. As much as about 15 to 20 weight percent, and even more in some cases, of such oleaginous lubricants may be incorporated in the polyolefin hot-melt coating compositions that are advantageously employed in the improved process of the invention.

Since the hot-melt compositions are applied at relatively high temperatures, it is advantageous, particularly when meat or meat products are involved, that the coating compositions be applied by a method which comprises freezing the article, or at least freezing the surface of the article of the meat product to be coated; and coating the frozen article with the molten composition. Such a method is beneficial in that the surface of the article being coated, particularly meats and the like, is less likely to attain discoloring temperatures, thus causing vaporization of surface juices and loss of bloom.

Articles which are not affected by high temperatures may be satisfactorily coated with the compositions applied by the process of the present invention. As a matter of fact, there are many instances where no significant advantage may be derived by chilling or freezing the article before coating. This would be the case, for example, when various metal, glass, and wooden articles are being coated.

A properly formulated composition should permit applied film thicknesses to be obtained by machine spray application techniques that are between about 5 and 100 mils and preferably less than about 50 mils with a single pass of the article to be coated under the falling curtain or film or other non-atomized spray of the hot melt. Of course, as can readily be appreciated generally thicker applied coatings can be obtained, if desired, especially when other coating techniques are utilized for their application. As a matter of fact, it may oftentimes be economically attractive for the thickness of the applied coatings to be in the neighborhood of 10–25 mils or so.

The invention is further illustrated in and by the following examples wherein, unless otherwise indicated, all parts and percentages are to be taken by weight.

*Example 1*

A number of wooden articles, including plain pieces of wood (such as coffee sticks, a salad serving spoon and fork set, a statuette and several chessmen) and metal articles (such as a small Phillips screw driver, a nickel spatula, a silver spoon and a brass candlestick) were dip-coated in a molten coating composition at 180° C. consisting of the following ingredients:

| | Parts |
|---|---|
| Polypropylene | 6 |
| Mineral oil | 0.6 |
| "Advastab CH–49" | 0.06 |
| "Inhibitor 162" | 0.01 |

The polypropylene employed as the principle ingredient in the coating composition has a molecular weight of about 32,000 and a degree of crystallinity of about 43 percent. The blended ingredients were heated to a molten state providing a clear, transparent solution having a viscosity of 4000 centipoises at 180° C. The articles were melt-coated and the coating was cured and hardened as in the following described way.

Some of the melt-coated articles were plunged immediately into an ethanol bath maintained at a temperature of about −25° C. The resulting quenched coating was a tough, clear film which closely conformed to the irregular contours of each article. Substantially none of the polymer in the resulting quenched coating had a degree of crystallinity in excess of 30 percent. Moreover, the film could be easily and completely peeled from the object enwrapped by the film.

In contrast to the superior protective coating produced by means of the quenching process shown above, some of the dip-coated wooden and metal articles were allowed to cool to room temperature and to harden in the usual or normal manner. The unquenched coating was undesirably cloudy, to the point of opacity. It was intolerably fragile to the extent that it flaked and powdered when an attempt was made to peel the air-cooled coating from the wooden and metal articles.

*Example 2*

Samples of frozen meats were dipped at 180° C. in a hot-melt protective coating composition consisting of 89 percent by weight of polypropylene, having a molecular weight of about 32,000 and about 43 percent crystallinity; 10 percent of refined mineral oil having a viscosity between about 95 and 105 Saybolt units at 100° F.; about 0.1 percent of 2,2′-methylene bis(4-ethyl - 6 - tertiarybutyl phenol); and about 1.0 percent of a mixture of about 72 weight percent of N-butyl ester of epoxidized fatty acids and about 28 weight percent of triphenyl phosphite. A relatively thick coating of between about 60–80 mils was obtained.

Some of the hot-melt coated meat samples were quenched in ice water within less than 60 seconds after they were removed from the hot melt. These protective coatings were slightly opaque, non-tacky, non-bleeding and peeled cleanly from the enveloped meat samples. The crystallinity of the treated polymer therein did not exceed 30 percent.

To illustrate practice not in accordance with the present invention, a few portions of the hot-melt coated meat were purposely cooled at room temperature. The observed quality of the encasing films was not good. Only because the frozen meat samples helped to quickly cool or quench the films did the coatings have any quality whatever. However, the unquenched meat casings were much less clear, showing considerable areas of opacity in comparison with those treated according to the present invention. The room-temperature cured casings were waxy and tended to chip or break rather than to peel cleanly.

*Example 3*

Protective coatings on meat, metal articles and wooden articles with properties similar to the outstanding and beneficial film properties described in Example 2 were obtained by following the procedure of the foregoing example with quenched coatings containing about 85 percent by weight of polypropylene; about 13 percent of a refined mineral oil; not more than about 1.0 percent of a non-toxic heat stabilizer; and not less than about 0.1 percent of a non-toxic antioxidant.

*Example 4*

Samples of frozen meat were dipped in molten polyethylene, having about 100 percent solids content and a molecular weight of about 8000. The hot coated samples were quenched in an ethanol bath maintained at a temperature of about −25° C. The rapidly cooled coatings of pure polyethylene were much clearer and tougher than the films from the same polymer on meat samples which were allowed to cool at room temperature. A clean separation of the quenched films from the frozen meat samples was accomplished.

What is claimed is:

1. Improvement in the process for packaging frozen meat and meat products with a substantially clear transparent tightly adhering seamless protective coating which comprises: (1) applying to the exposed surfaces of said frozen product a coating of a fluid organic thermoplastic coating composition in the molten state having a viscosity within the range of from about 3500 to about 6500 centipoises at temperatures within the range of from about 140° C. to about 220° C., said coating composition being composed essentially of a polymer product of an α-olefin monomer containing from 2 to 4 carbon atoms, said polymer product being further characterized as having a molecular weight of from about 8000 to about 50,000 and a degree of crystallinity in excess of 30 percent; and (2) quenching the coated product to a temperature within the range of from about plus 20° C. to about minus 25° C. in a cold bath within not more than about 60 seconds after application of the molten fluid coating composition, the solidified tough substantially clear transparent polyolefin coating thus obtained being characterized as having a degree of crystallinity of less than 30 percent.

2. Improvement in the process for packaging frozen meat and meat products with a substantially clear transparent tightly adhering seamless protective coating which comprises: (1) applying to the exposed surfaces of said frozen product a coating of a fluid organic thermoplastic coating composition in the molten state having a viscosity not in excess of about 5000 centipoises at temperatures within the range of from about 140° C. to about 220° C., said coating composition being composed essentially of (A) from about 85 to about 100 parts by weight of polypropylene, said polypropylene being characterized as having a molecular weight of from about 10,000 to about 50,000 and having a degree of crystallinity in excess of 30 percent, (B) up to about 15 parts by weight of a refined mineral oil having a Saybolt viscosity at 100° F. of from about 80 to 400 units, and (C) respective stabilizing quantities of a non-toxic color stabilizer and a non-toxic antioxidant for said coating composition; (2) quenching the coated frozen product to a temperature within the range of from about plus 20° C. to about minus 25° C. in a cold bath within not more than about 60 seconds after appliaction of the molten fluid coating composition, the solidified substantially clear transparent tough polypropylene-containing coating thus obtained being characterized as having a degree of crystallinity of less than 30 percent.

3. Improvement in the process for protectively coating the exposed surfaces of a normally solid article of manufacture formed of at least one material of the group consisting of glass, metal and wood which comprises: (1) applying to said surfaces, while said article is maintained under normal conditions of temperature and humidity, a coating of a fluid organic thermoplastic coating composition in the molten state having a viscosity in the range of from about 3500 to about 6500 centipoises at temperatures within the range of from about 140° C. to about 220° C., said coating composition being composed essentially of the polymer product of an α-olefin monomer of from 2 to 4 carbon atoms, said polymeric material being further characterized as having a molecular weight of from about 8000 to about 50,000 and a degree of crystallinity in excess of 30 percent; and (2) quenching the coated product to a temperature within the range of from about plus 20° C. to about minus 25° C. in a cold bath within not more than about 60 seconds after application of the coating composition, the solidified substantially clear transparent tough polyolefin coating thus obtained being characterized as having a degree of crystallinity of less than 30 percent.

4. The process of claim 3, wherein said fluid coating composition is polyethylene having a molecular weight of about 8000.

5. The process of claim 3, wherein said fluid coating composition is polypropylene having a molecular weight of about 32,000.

6. The process of claim 3, wherein said fluid coating composition is applied to said article by dip-coating the composition thereon.

7. The process of claim 3, wherein said fluid coating composition is applied to said article by spray coating the coating composition thereover.

8. Improvement in the process for protectively coating the exposed surfaces of a normally solid article of manufacture formed of at least one material selected from the group consisting of glass, metal and wood which comprises: (1) applying to said surfaces, while said article is maintained under normal conditions of temperature and humidity, a coating of a fluid organic thermoplastic coating composition in the molten state having a viscosity not in excess of about 5000 centipoises at temperatures within the range of from about 140° C. to about 220° C., said coating composition being composed essentially of (A) from about 85 to about 100 parts by weight of polypropylene, said polypropylene being characterized as having a molecular weight of from about 10,000 to about 50,000 and having a degree of crystallinity in excess of 30 percent, (B) up to about 15 parts by weight of a refined mineral oil having a Saybolt viscosity at 100° F. of from about 80 to 400 units, and (C) respective stabilizing quantities of a color stabilizer and an antioxidant for the composition; and (2) rapidly quenching the coated article to a temperature within the range of from about plus 20° C. to about minus 25° C. in a cold bath within not more than about 60 seconds after application of the molten fluid coating composition the solidified substantially clear transparent tough polypropylene-containing coating thus obtained being characterized as having a degree of crystallinity of less than 30 percent.

9. The process of claim 1, wherein the molten coating composition is polyethylene having an average molecular weight of about 8000.

10. The process of claim 1, wherein the molten coating composition is polypropylene having an average molecular weight of about 8000.

11. The process of claim 1, wherein the molten fluid coating composition is applied to said frozen product by dip-coating the coating composition thereon.

12. The process of claim 1, wherein the molten fluid coating composition is applied to said frozen product by spray-coating the coating composition thereover.

13. The process of claim 2, wherein the molten fluid coating composition is applied to said frozen product by dip-coating the coating composition thereon and wherein the molten fluid coating composition has a viscosity of about 4000 centipoises at a temperature of about 180° C.

14. The process of claim 2, wherein the molten fluid coating composition is applied to said frozen product by spray-coating the coating composition thereover.

References Cited in the file of this patent

UNITED STATES PATENTS

| | | |
|---|---|---|
| 2,868,656 | Patten et al. | Jan. 13, 1959 |
| 2,951,763 | Kelly et al. | Sept. 6, 1960 |
| 3,061,446 | Norman et al. | Oct. 30, 1962 |

FOREIGN PATENTS

| | | |
|---|---|---|
| 502,597 | Canada | May 18, 1954 |
| 595,256 | Canada | Mar. 29, 1960 |

UNITED STATES PATENT OFFICE
CERTIFICATE OF CORRECTION

Patent No. 3,132,027                         May 5, 1964

Frederick H. Norton et al.

It is hereby certified that error appears in the above numbered patent requiring correction and that the said Letters Patent should read as corrected below.

Column 2, lines 30 and 31, for "protetive" read -- protective --; column 3, line 59, for "end" read -- tend --; column 8, line 33, for "8000" read -- 32,000 --.

Signed and sealed this 13th day of October 1964.

(SEAL)
Attest:

ERNEST W. SWIDER
Attesting Officer

EDWARD J. BRENNER
Commissioner of Patents